United States Patent
Ito

(10) Patent No.: US 11,267,517 B2
(45) Date of Patent: Mar. 8, 2022

(54) MEMBER AND VEHICLE FRAME

(71) Applicant: NIPPON STEEL CORPORATION, Tokyo (JP)

(72) Inventor: Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/280,063

(22) PCT Filed: Oct. 31, 2019

(86) PCT No.: PCT/JP2019/042723
§ 371 (c)(1),
(2) Date: Mar. 25, 2021

(87) PCT Pub. No.: WO2020/090956
PCT Pub. Date: May 7, 2020

(65) Prior Publication Data
US 2021/0309300 A1   Oct. 7, 2021

(30) Foreign Application Priority Data
Oct. 31, 2018  (JP) .............................. JP2018-205024

(51) Int. Cl.
*B62D 27/00* (2006.01)
*B62D 25/04* (2006.01)
*B62D 27/02* (2006.01)

(52) U.S. Cl.
CPC ........... *B62D 27/023* (2013.01); *B62D 25/04* (2013.01)

(58) Field of Classification Search
CPC ........ B62D 25/04; B62D 25/06; B62D 27/02; B62D 27/023

USPC ................................ 296/193.06, 191, 29, 30
See application file for complete search history.

(56) References Cited

U.S. PATENT DOCUMENTS
2016/0083016 A1   3/2016  Imada et al.

FOREIGN PATENT DOCUMENTS

| JP | 2016-64725 A | 4/2016 |
|---|---|---|
| JP | 2016-124029 A | 7/2016 |
| JP | 6049146 B2 | 12/2016 |
| JP | 6203647 B2 | 9/2017 |

OTHER PUBLICATIONS

International Search Report for PCT/JP2019/042723 (PCT/ISA/210) dated Dec. 24, 2019.

*Primary Examiner* — Dennis H Pedder
(74) *Attorney, Agent, or Firm* — Birch, Stewart, Kolasch & Birch, LLP

(57) ABSTRACT

This member includes a first sheet material and a second sheet material overlapped with the first sheet material, and the first sheet material and the second sheet material are joined to each other at an interface therebetween by three joint line portions. A first joint line portion includes an A portion whose shortest in-plane distance from a second joint line portion is 20 times or more and 120 times or less a sheet thickness of the first sheet material, a second joint line portion includes a B portion whose shortest in-plane distance from the first joint line portion is 20 times or more and 120 times or less the sheet thickness of the first sheet material, a third joint line portion is in a region interposed between the A portion and the B portion, and has a length of a length component of 250 mm or more in an extension direction of an intermediate line between the first joint line portion and the second joint line portion.

28 Claims, 9 Drawing Sheets

MEMBER AND VEHICLE FRAME

TECHNICAL FIELD OF THE INVENTION

The present invention relates to a member and a vehicle frame. Priority is claimed on Japanese Patent Application No. 2018-205024, filed Oct. 31, 2018, the content of which is incorporated herein by reference.

RELATED ART

In the related art, Patent Document 1 below describes a laser welded lap joint between high strength steel sheets. Patent Document 2 below describes a technique postulating that different deformation modes are set without combining reinforcing steel sheet in a complex manner.

PRIOR ART DOCUMENT

Patent Document

[Patent Document 1] Japanese Patent No. 6203647
[Patent Document 2] Japanese Patent No. 6049146

DISCLOSURE OF THE INVENTION

Problems to be Solved by the Invention

In order to achieve a further reduction in the weight of a vehicle, for example, it is desirable to allow a structural member to have different thicknesses by increasing the sheet thickness of a portion that needs high strength and decreasing the sheet thickness of a portion that does not need high strength. A technique for realizing a structural member having different thicknesses, a blank having different thicknesses is known. As a technique related to the blank having different thicknesses, there are techniques such as tailor rolled blank (TRB) and tailor welded blank (TWB).

TRB is a technique for manufacturing a blank having different thicknesses by causing different thicknesses limited to a rolling direction, but the direction in which a change in thickness occurs is limited to the rolling direction. For this reason, a change in thickness cannot be incurred in directions other than the rolling direction, and it is difficult to achieve free sheet thickness design.

TWB is a technique for manufacturing a blank having different thicknesses by arranging sheet materials having different thicknesses and welding end surfaces corresponding to the contour lines of the sheet materials. In TWB, from the viewpoint of ease of welding and the like, the end surfaces of straight lines are often welded to each other, so that the weld line becomes a straight line. Therefore, it is difficult to achieve free sheet thickness design for each plane region.

Therefore, for example, as described in Patent Document 1 and Patent Document 2, it is conceivable to change the sheet thickness for each region by joining the surfaces of a plurality of sheet materials (for example, two sheet materials). However, the technique described in Patent Document 1 is used for joint applications by performing laser welding on high strength steel sheets, and is not intended for free sheet thickness design for blanks. In addition, since the technique is used for joint applications, a direction perpendicular to the weld line is postulated as a direction in which a load is applied.

The technique described in Patent Document 2 is a technique postulating that a deformation mode is controlled by bonding sheet materials, and is not a technique postulating that a plurality of sheet materials are joined to exhibit a strength equivalent to that of a single sheet.

Therefore, the present invention has been made in view of the above problems, and an object of the present invention is to provide a novel and improved member and a vehicle frame capable of satisfying both an improvement in collision safety and a demand for a reduction in weight by realizing different thicknesses in a free manner.

Means for Solving the Problem

In order to solve the above problems, the present disclosure employs the following means.

(1) According to a first aspect of the present disclosure, a member includes: a first sheet material; a second sheet material; a first joint line portion; a second joint line portion; and a third joint line portion, in which a sheet thickness of the first sheet material is equal to or less than a sheet thickness of the second sheet material, the first sheet material and the second sheet material are overlapped with each other, the first joint line portion, the second joint line portion, and the third joint line portion each join the first sheet material and the second sheet material at an interface between the first sheet material and the second sheet material, the first joint line portion includes an A portion whose shortest in-plane distance from the second joint line portion is 20 times or more and 120 times or less the sheet thickness of the first sheet material, the second joint line portion includes a B portion whose shortest in-plane distance from the first joint line portion is 20 times or more and 120 times or less the sheet thickness of the first sheet material, the third joint line portion is in a first region interposed between the A portion and the B portion, and a length of a length component of the third joint line portion in the first region in an extension direction of an intermediate line between the first joint line portion and the second joint line portion is 250 mm or more.

(2) In the aspect according to (1), the third joint line portion may be in a second region which is in the first region and is within 20% of a distance between the first joint line portion and the second joint line portion from an intermediate point between the first joint line portion and the second joint line portion on a straight line orthogonal to the intermediate line.

(3) In the aspect according to (2), a continuous length of a length component of the third joint line portion in the second region in the extension direction of the intermediate line between the first joint line portion and the second joint line portion may be 250 mm or more.

(4) In the aspect according to any one of (1) to (3), the third joint line portion may be in a third region which is in the first region and is in a range of 40 times or less the sheet thickness of the first sheet material from the first joint line portion.

(5) In the aspect according to (4), a continuous length of a length component of the third joint line portion in the third region in the extension direction of the intermediate line between the first joint line portion and the second joint line portion may be 250 mm or more.

(6) According to a second aspect of the present disclosure, a vehicle frame including the member according to any one of (1) to (5), includes: a first ridge portion; a second ridge portion; and a top wall portion, in which the top wall portion is between the first ridge portion and the second ridge portion, the first joint line portion, the second joint line portion, and the third joint line portion are in the top wall portion, and the top wall portion is disposed so as to be on an outside of a vehicle.

(7) According to a third aspect of the present disclosure, a member includes: a first sheet material; a second sheet material; a first joint line portion; a third joint line portion; and a first ridge portion, in which a sheet thickness of the first sheet material is equal to or less than a sheet thickness of the second sheet material, the first sheet material and the second sheet material are overlapped with each other at the first ridge portion, the first joint line portion, and the third joint line portion, the first joint line portion and the third joint line portion each join the first sheet material and the second sheet material at an interface between the first sheet material and the second sheet material, the first joint line portion includes an A portion whose shortest in-plane distance from the first ridge portion is 20 times or more and 120 times or less the sheet thickness of the first sheet material, the first ridge portion includes a B portion whose shortest in-plane distance from the first joint line portion is 20 times or more and 120 times or less the sheet thickness of the first sheet material, the third joint line portion is in a first region interposed between the A portion and the B portion, and a length of a length component of the third joint line portion in the first region in an extension direction of an intermediate line between the first joint line portion and the first ridge portion is 250 mm or more.

(8) In the aspect according to (7), the third joint line portion may be in a second region which is in the first region and is within 20% of a distance between the first joint line portion and the first ridge portion from an intermediate point between the first joint line portion and the first ridge portion on a straight line orthogonal to the intermediate line.

(9) In the aspect according to (8), a continuous length of a length component of the third joint line portion in the second region in the extension direction of the intermediate line between the first joint line portion and the first ridge portion may be 250 mm or more.

(10) In the aspect according to any one of (7) to (9), the third joint line portion may be in a third region which is in the first region and is in a range of 40 times or less the sheet thickness of the first sheet material from the first joint line portion.

(11) In the aspect according to (10), a continuous length of a length component of the third joint line portion in the third region in the extension direction of the intermediate line between the first joint line portion and the first ridge portion may be 250 mm or more.

(12) In the aspect according to any one of (7) to (11), the third joint line portion may be in a fourth region which is in the first region and is in a range of 40 times or less the sheet thickness of the first sheet material from the first ridge portion.

(13) In the aspect according to (12), a continuous length of a length component of the third joint line portion in the fourth region in the extension direction of the intermediate line between the first joint line portion and the first ridge portion may be 250 mm or more.

(14) In the aspect according to any one of (7) to (13), all end portions of the first sheet material may be inside the second sheet material.

(15) In the aspect according to any one of (7) to (14), all end portions of the second sheet material may be inside the first sheet material.

(16) In the aspect according to any one of (1) to (5) and (7) to (15), the first joint line portion may be provided along a longitudinal direction of the first sheet material.

(17) In the aspect according to any one of (1) to (5) and (7) to (15), the first joint line portion may be provided along a longitudinal direction of the second sheet material.

(18) According to a fourth aspect of the present disclosure, a vehicle frame including the member according to any one of (7) to (13), includes: a second ridge portion; and a top wall portion, in which the top wall portion is between the first ridge portion and the second ridge portion, the first joint line portion and the third joint line portion are in the top wall portion, and the top wall portion is disposed so as to be on an outside of a vehicle.

(19) In the aspect according to (18), the first sheet material and the second sheet material may be overlapped with each other at the second ridge portion.

(20) According to a fifth aspect of the present disclosure, a vehicle frame that is a hat-shaped member, includes: a first member; a second member; a fourth joint line portion; a first ridge portion; and a second ridge portion, in which a sheet thickness of the first member is equal to or less than a sheet thickness of the second member, the first member and the second member are overlapped with each other at the first ridge portion and the second ridge portion, the first member has a top wall portion extending in a longitudinal direction of the hat-shaped member, the second member has a top wall portion extending in the longitudinal direction of the hat-shaped member, the first ridge portion is a ridge portion of one ends of the top wall portion of the first member and the top wall portion of the second member, at which the first member and the second member are overlapped with each other, the second ridge portion is a ridge portion of the other ends of the top wall portion of the first member and the top wall portion of the second member, at which the first member and the second member are overlapped with each other, the first ridge portion, the second ridge portion, and the fourth joint line portion join the first member and the second member at an interface between the first member and the second member, the first ridge portion includes a C portion whose shortest in-plane distance from the second ridge portion is 20 times or more and 120 times or less the sheet thickness of the first member, the second ridge portion includes a D portion whose shortest in-plane distance from the first ridge portion is 20 times or more and 120 times or less the sheet thickness of the first member, the fourth joint line portion is in a fifth region interposed between the C portion and the D portion, a continuous length of a length component of the fourth joint line portion in the fifth region in an extension direction of an intermediate line between the first ridge portion and the second ridge portion is 250 mm or more, and the top wall portion of the first member and the top wall portion of the second member are disposed so as to be on an outside of a vehicle.

(21) In the aspect according to (20), the fourth joint line portion may be in a sixth region which is in the fifth region and is within 20% of a distance between the first ridge portion and the second ridge portion from an intermediate point between the first ridge portion and the second ridge portion on a straight line orthogonal to the intermediate line.

(22) In the aspect according to (21), a continuous length of a length component of the fourth joint line portion in the sixth region in the extension direction of the intermediate line between the first ridge portion and the second ridge portion may be 250 mm or more.

(23) In the aspect according to any one of (20) to (22), the fourth joint line portion may be in a seventh region which is in the fifth region and is in a range of 40 times or less the sheet thickness of the first member from the first ridge portion.

(24) In the aspect according to (23), a continuous length of a length component of the fourth joint line portion in the fifth region in the extension direction of the intermediate line between the first ridge portion and the second ridge portion may be 250 mm or more.

Effects of the Invention

According to the present invention, it is possible to provide a member and a vehicle frame capable of satisfying both an improvement in collision safety and a demand for a reduction in weight by realizing different thicknesses in a free manner.

EMBODIMENTS OF THE INVENTION

Figure 1:
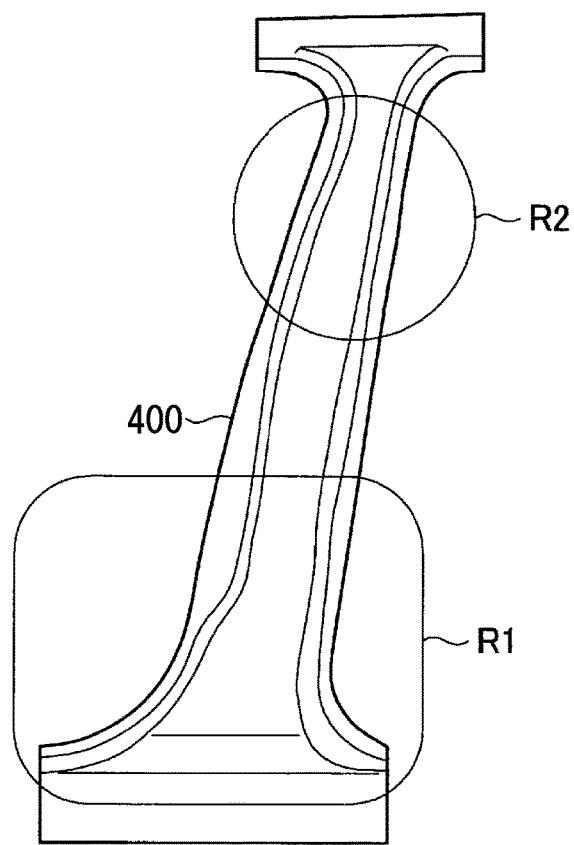
FIG. 1 is a schematic view illustrating a state in which a B pillar is viewed from a side of a vehicle.

Hereinafter, preferred embodiments of the present disclosure will be described in detail with reference to the accompanying drawings. In the present specification and the drawings, like constituent elements having substantially the same functional configuration are denoted by like reference numerals, and overlapping description will be omitted.

1. Overview

For example, steel sheets are used to form the vehicle body of a vehicle such as an automobile. The vehicle body is required to have resistance to buckling in order to secure collision characteristics in the event of a collision. At the same time, the vehicle body is also required to have a reduced weight in order to improve its performance as a vehicle. The present embodiment relates to a member used for such a vehicle body and a vehicle frame including the member. In addition, such a member is manufactured by forming a blank. In the present disclosure, the blank is included in the member. This is because the member and the blank as the material of the member have the same characteristics. In the following, there are cases where the member may be replaced with the blank for description.

FIG. 1 is a schematic view illustrating an example of a member included in a vehicle body, and illustrates a B pillar 400 for connection between a floor and a roof between a front seat and a rear seat on a side surface of the vehicle. Here, FIG. 1 illustrates a state in which the B pillar 400 is viewed from a side (outside) of the vehicle.

The resistance to buckling required for the member included in the vehicle body such as the B pillar 400 differs depending on the position or region in the member. For example, in the B pillar 400, a range indicated by a region R1 in FIG. 1 corresponds to a position where there is a high possibility that the bumper or the like of another vehicle may collide when the vehicle collides from the side surface. Therefore, in the region R1, it is desirable that the sheet thickness of the B pillar 400 is relatively small so that the impact of the collision can be easily absorbed. By reducing the sheet thickness of the B pillar 400 in the region R1, the B pillar 400 is deformed (crushed) when the bumper of another vehicle collides and can effectively absorb the impact.

On the other hand, a range indicated by a region R2 has higher stiffness and resistance to buckling than the range indicated by the region R1. Therefore, the range has a function of suppressing deformation (deflection) to the minimum and suppressing the intrusion of the colliding object into the vehicle when the bumper collides. In addition, the range indicated by the region R2 supports the roof of the vehicle, and has a function of suppressing the collapse of the roof and protecting the occupants in a case where the vehicle rolls over or the like. By suppressing the deflection and collapse of the B pillar 400 in the range indicated by the region R2, it is possible to reliably protect an occupant inside the vehicle body. Therefore, in the region R2, it is desirable to increase the sheet thickness of the B pillar 400 from the viewpoint of securing resistance to buckling and stiffness. By increasing the sheet thickness of the B pillar 400 in region R2, in a case where the vehicle rolls over or another vehicle collides, the intrusion of the B pillar 400 into the vehicle body is suppressed, and the collapse of the B pillar 400 in the longitudinal direction thereof is suppressed. Therefore, the occupant can be reliably protected.

As described above, the resistance to buckling required for the member included in the vehicle body differs depending on the position and region in the member. Therefore, for the blank for forming the member, free sheet thickness design such as increasing the sheet thickness of a portion that needs high resistance to buckling and decreasing the sheet thickness of a portion that does not need high resistance to buckling is required. With such sheet thickness design, only a necessary portion secures a sufficient sheet thickness, so that it is possible to achieve a reduction in the weight of the vehicle body.

On the other hand, as described above, with techniques such as TRB and TWB, free sheet thickness design cannot be achieved, and the sheet thickness is increased even in a portion that does not need resistance to buckling, so that it is difficult to achieve both a further reduction in weight and securing resistance to buckling. In the present embodiment, by realizing a member that enables free sheet thickness design, it is possible to provide a member and a vehicle frame capable of satisfying higher demands for both resistance to buckling and a reduction in weight. The details will be described below.

2. Configuration of Member (Blank)

Figure 2:
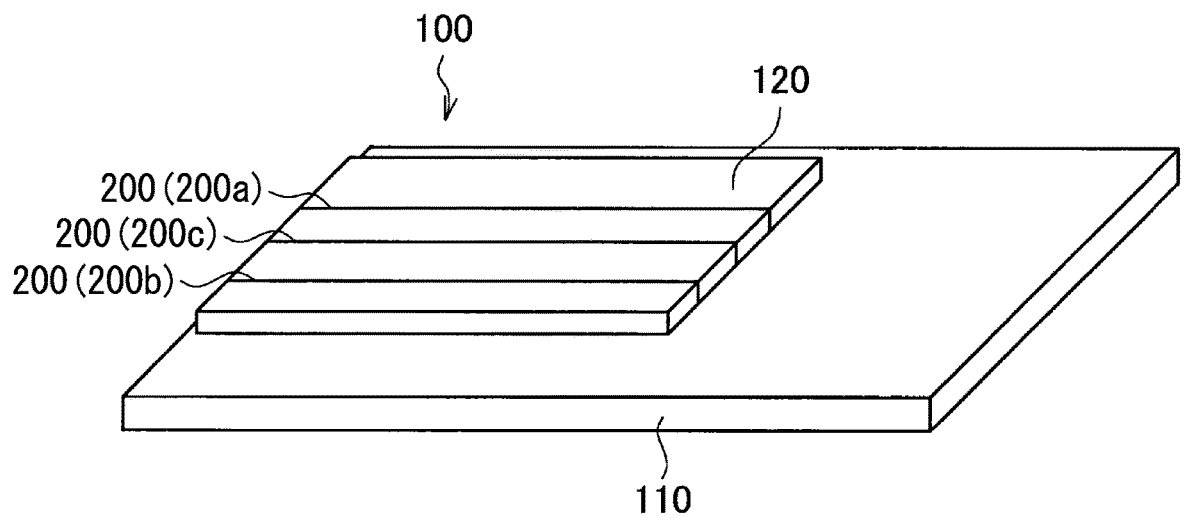
FIG. 2 is a perspective view illustrating a configuration of a blank according to an embodiment of the present invention.

FIG. 2 is a perspective view illustrating the configuration of a blank 100 according to the present embodiment. As illustrated in FIG. 2, the blank 100 according to the present embodiment is constituted by a first sheet material 110 and a second sheet material 120, and the first sheet material 110 and the second sheet material 120 are overlapped with each other. All the end portions of the second sheet material 120 are inside the first sheet material 110 when viewed in a sheet thickness direction. That is, the second sheet material 120 is smaller than the first sheet material 110, and a contour line showing the contour of the second sheet material 120 is located inside a contour line showing the contour of the first sheet material 110. In addition, all the end portion of the first sheet material 110 may be inside the second sheet material 120 when viewed in the sheet thickness direction. That is, the first sheet material 110 is smaller than the second sheet material 120, and the contour line showing the contour of the first sheet material 110 may be located inside the contour line showing the contour of the second sheet material 120.

The second sheet material 120 is joined to the first sheet material 110. In the present embodiment, in particular, the first sheet material 110 and the second sheet material 120 are joined to each other by continuous joining. Here, continuous joining does not include point-shaped joining such as so-called spot welding. The first sheet material 110 and the second sheet material 120 are joined by continuous line joining.

It is preferable that the first sheet material 110 and the second sheet material 120 are joined to each other by line welding. However, it is not necessary that all the joint lines of the line welding are continuous, and there may be a region on the extension line of the joint lines where the line welding is not performed. In addition, it is preferable that laser welding is performed as the line welding. FIG. 2 illustrates a state in which the first sheet material 110 and the second sheet material 120 are joined to each other by line welding as laser welding. Therefore, three joint line portions 200 are formed on the surface of the second sheet material 120. Specifically, the three joint line portions 200 each join the first sheet material 110 and the second sheet material 120 at the interface between the first sheet material 110 and the second sheet material 120. In addition, in this specification, there are cases where the "joint line portion" is simply referred to as a "joint line". The joint line 200 may be provided along the longitudinal direction of the sheet material having a small contour line (the second sheet material 120 in FIG. 2). The joint line 200 may not be completely continuous, and may partially have an interval of, for example, about 30 mm, preferably about 20 mm. A film such as plating or foil may be interposed between the first sheet material 110 and the second sheet material 120.

In FIG. 2, although three joint line portions are formed in the sheet material, in a case where ridges are formed in the overlapped members, the joint line portions may be replaced with ridge portions. At the ridge portion, the first sheet material 110 and the second sheet material 120 may be overlapped with each other. This is because a portion where the ridge of the sheet material is formed is less likely to be curved, and is thus less likely to be deformed as if the sheet material is restrained by the joint line.

In FIG. 2, an example in which the blank 100 is constituted by the first sheet material 110 and the second sheet material 120 is illustrated. However, the blank 100 may be constituted by three or more sheet materials. In a case where the blank 100 is constituted by three or more sheet materials, the presence or absence of joining and the form of joining between the other sheet materials constituting the blank 100 and the first sheet material 110 and/or the second sheet material 120 are not particularly limited as long as the first sheet material 110 and the second sheet material 120 are appropriately joined by line joining. Furthermore, the blank 100 may be constituted by a plurality of sheet materials selected from a plurality of sheet thicknesses. In the present embodiment, a case where the sheet thickness of the first sheet material 110 is equal to or less than the sheet thickness of the sheet material of the second sheet material 120 will be described as an example.

The first sheet material 110 and the second sheet material 120 may be sheet materials having different tensile strengths. For example, the first sheet material 110 having a larger contour line than the second sheet material 120 is a sheet material serving as a base of the blank 100, and the second sheet material 120 functions as a reinforcing sheet material. Therefore, the tensile strength of the second sheet material 120 may be higher than that of the first sheet material 110.

The first sheet material 110 and the second sheet material 120 may have different amounts of carbon (amounts of C) contained in the sheet materials. The amount of carbon may be measured at a ¼ depth position of the sheet thickness of each sheet material from the surface of each sheet material. For example, the blank 100 can be formed by being subjected to hot stamping. Here, the tensile strengths of the first sheet material 110 and the second sheet material 120 after quenching can be changed depending on the amount of C contained in the sheet materials. For example, in a case where the amount of C contained in the second sheet material 120 is larger than the amount of C contained in the first sheet material 110, the tensile strength of a portion of the second sheet material 120 becomes higher than that of a portion of the first sheet material 110 after hot stamping. The tensile strengths of the first sheet material 110 and the second sheet material 120 are suitably set to 590 MPa or more.

The surfaces of the first sheet material 110 and the second sheet material 120 may be plated with aluminum or the like. However, the surface serving as the joint surface where the first sheet material 110 and the second sheet material 120 are in close contact with each other does not have to be plated.

According to the blank 100 of the present embodiment configured as described above, by joining the second sheet material 120 only to the necessary portion on the first sheet material 110, only the portion that needs resistance to buckling (that is, an improvement in collision safety) can be thickened to secure the resistance to buckling, while the sheet thickness of the portion that does not require high resistance to buckling can be reduced. As a result, it is possible to configure the blank 100 that enables free sheet thickness design and satisfies both resistance to buckling and the demand for a reduction in weight. The member such as the B pillar 400 illustrated in FIG. 1 is configured by performing press forming on the blank 100.

Figure 3A:
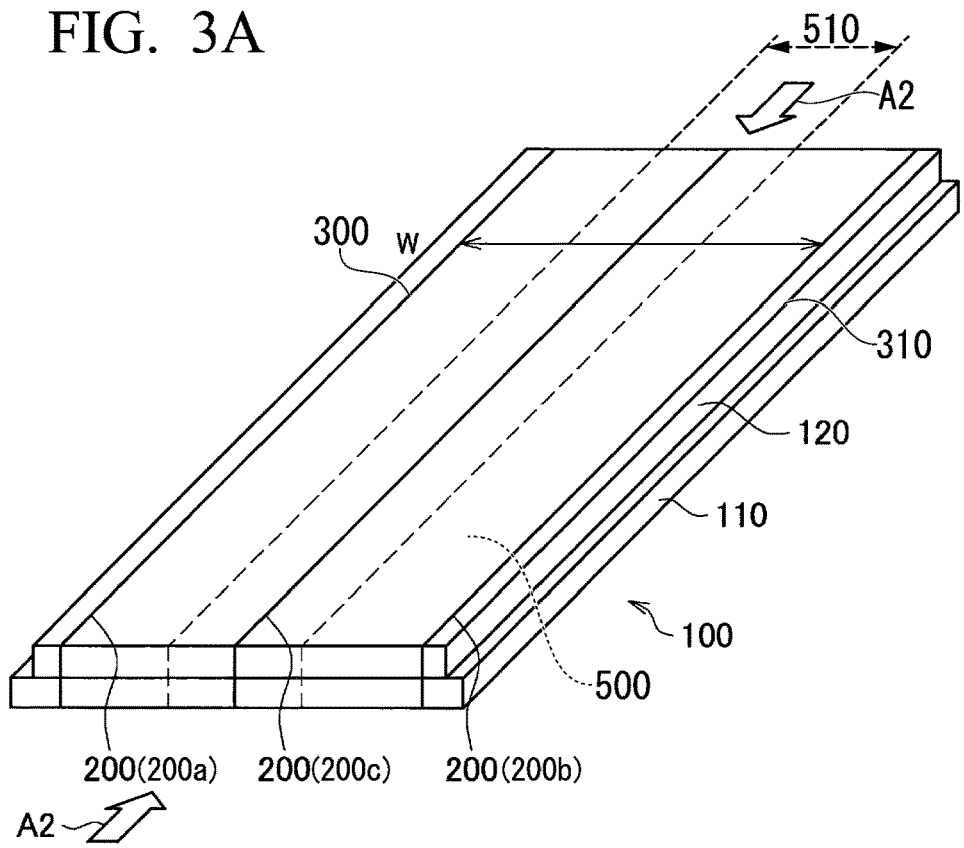
FIG. 3A is a schematic view illustrating joint lines 200 of line welding in which a first sheet material and a second sheet material of the embodiment are welded to each other.
Figure 3B:
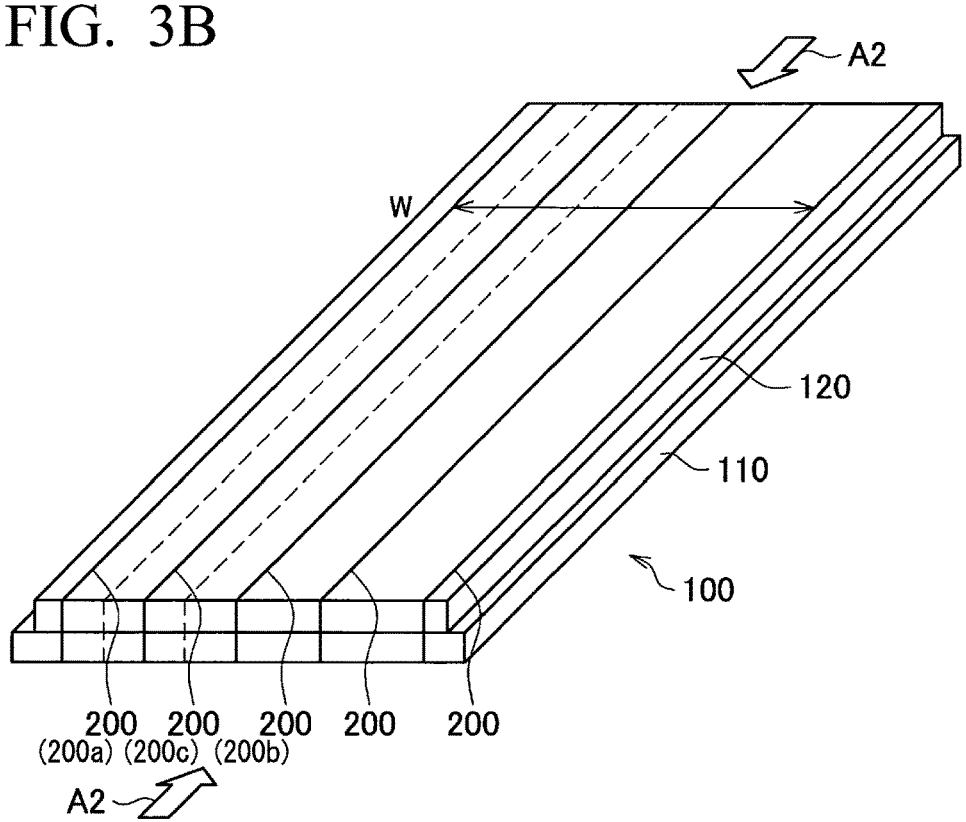
FIG. 3B is a schematic view illustrating joint lines of line welding in which the first sheet material and the second sheet material of the embodiment are welded to each other.

FIGS. 3A and 3B are schematic views illustrating the joint lines 200 of line welding in which the first sheet material 110 and the second sheet material 120 are welded to each other. FIG. 3A illustrates an example in which the first sheet material 110 and the second sheet material 120 are joined to each other by three joint lines 200 as in FIG. 2. FIG. 3B illustrates an example in which the first sheet material 110 and the second sheet material 120 are joined to each other by five joint lines 200.

In a case where a load is applied to the blank 100 in an arrow A2 direction shown in FIGS. 3A and 3B, an initial reaction force is generated. At that time, the sheet material may warp. When the sheet material warps, not the entire cross section of the sheet material receives the load. In order to increase the initial reaction force, it is desirable to suppress the occurrence of warpage and to make regions for receiving the load larger in the cross section in the sheet width direction. The present inventors found that by disposing at least three joint line portions (including ridge portions) at predetermined positions, the warpage of regions surrounded by the joint line portions can be suppressed. The details will be described below.

As illustrated in FIG. 3A, the first sheet material 110 and the second sheet material 120 are overlapped with each other, and a first joint line portion 200a, a second joint line portion 200b, and a third joint line portion 200c each join the first sheet material 110 and the second sheet material 120 at the interface between the first sheet material 110 and the second sheet material 120.

Figure 3C:
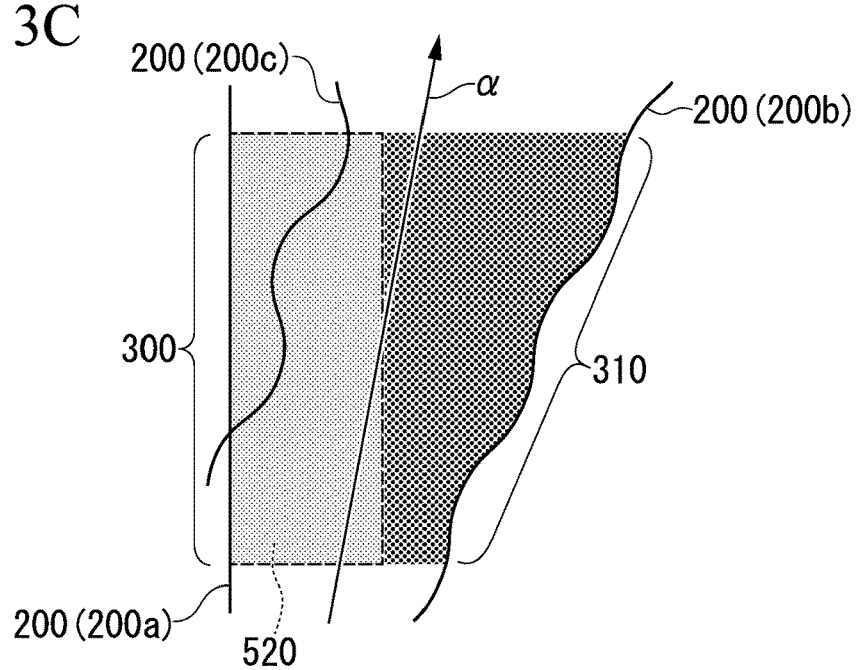
FIG. 3C is a schematic view illustrating joint lines of line welding in which the first sheet material and the second sheet material of the embodiment are welded to each other.

FIG. 3C is a schematic view illustrating different forms of the first joint line portion 200a, the second joint line portion 200b, and the third joint line portion 200c. As illustrated in FIG. 3C, the first joint line portion 200a includes an A portion 300 whose shortest in-plane distance from the second joint line portion 200b is 20 times or more and 120 times or less the sheet thickness of the first sheet material 110. The second joint line portion 200b includes a B portion 310 whose shortest in-plane distance from the first joint line portion 200a is 20 times or more and 120 times or less the sheet thickness of the first sheet material 110. As illustrated in FIG. 3A, of the three joint line portion 200, the third joint line portion 200c at the center is in a first region 500 interposed between the A portion 300 and the B portion 310. The "shortest in-plane distance" is the shortest distance on a path along the sheet materials of the first sheet material 110 and the second sheet material 120. In the example illustrated in FIG. 3A, the shortest in-plane distance is the distance between the first joint line portion 200a and the second joint line portion 200b when the sheet material is viewed in a plan view.

The length of the length component of the third joint line portion 200c in the first region 500 in an extension direction α of the intermediate line between the first joint line portion 200a and the second joint line portion 200b is 250 mm or more. The "extension direction of the intermediate line between the first joint line portion 200a and the second joint line portion 200b" is the direction indicated by reference numeral α in FIG. 3C.

With such a configuration of the three joint line portions 200, the initial reaction force can be increased, and the warpage of the sheet material can be suppressed.

The first joint line portion 200a, the second joint line portion 200b, and the third joint line portion 200c may be a straight line or a curved line. In a case where at least one of the first joint line portion 200a or the second joint line portion 200b is a curved line, the intermediate line between the first joint line portion 200a and the second joint line portion 200b is also a curved line. In a case where the intermediate line is a curved line, the extension direction of the intermediate line cannot be uniquely defined. Therefore, in the present disclosure, in the case where the intermediate line is a curved line, the direction of the straight line connecting the intersection points between the end portions of the first region 500 and the intermediate line is regarded as the extension direction of the intermediate line.

Each joint line portion 200 may be connected to another joint line portion 200 to form one joint line.

As illustrated in FIG. 3A, the third joint line portion 200c is preferably in a second region 510. The second region 510 is a region which is included in the first region 500 and is within 20% of the distance between the first joint line portion 200a and the second joint line portion 200b from the intermediate point between the first joint line portion 200a and the second joint line portion 200b on a straight line orthogonal to the intermediate line.

It is preferable that the continuous length of the length component of the third joint line portion 200c in the second region 510 in the extension direction of the intermediate line between the first joint line portion 200a and the second joint line portion 200b is 250 mm or more. The "extension direction of the intermediate line between the first joint line portion 200a and the second joint line portion 200b" is the direction indicated by reference numeral α in FIG. 3C.

As illustrated in FIG. 3C, it is preferable that the third joint line portion 200c is in a third region 520. The third region 520 is a region which is included in the first region 500 and is in a range of 40 times or less the sheet thickness of the first sheet material 110 from the first joint line portion 200a.

It is preferable that the continuous length of the length component of the third joint line portion 200c in the third region 520 in the extension direction of the intermediate line between the first joint line portion 200a and the second joint line portion 200b is 250 mm or more.

In FIGS. 2 and 3A, three joint line portions are formed in the sheet material. However, in a case where the blank is formed and the member has a shape including a ridge such as a hat type, the joint line portion may be a ridge portion. That is, the joint line portion can be replaced with the ridge portion. For example, the second joint line portion 200b illustrated in FIG. 3A may be replaced with a ridge portion. By the configuration of the two joint line portions 200a and 200c and the joint line portion 200b which is a ridge, the initial reaction force can be increased, and the warpage of the sheet material can be suppressed. In this case, the third joint line portion 200c may be in a fourth region (not illustrated) which is in the first region 500, and is in a range of 40 times or less the sheet thickness of the first sheet material 110 from the joint line portion 200b which is the ridge portion. It is preferable that the continuous length of the length component of the third joint line portion 200c in the fourth region in the extension direction of the intermediate line between the first joint line portion 200a and the ridge portion is 250 mm or more. The third joint line portion 200c may also be in the third region 520.

As described above, in order to increase the initial reaction force, it is desirable to suppress the occurrence of warpage and to make the regions for receiving the load larger in the cross section in the sheet width direction. Furthermore, the inventors found that the initial reaction force is increased by the relationship between the sheet thickness and the sheet width of a predetermined sheet material. The details will be described below.

In order to increase the initial reaction force, it is desirable that the width that can receive the load is large in the total sheet width $W_0$ of the sheet material. Therefore, the ratio of the width of the sheet material that can receive the load to the total sheet width $W_0$ of the sheet material is defined as an effective width. Specifically, the effective width is the ratio of the width that acts to receive the load to the total sheet width $W_0$.

Figure 5:
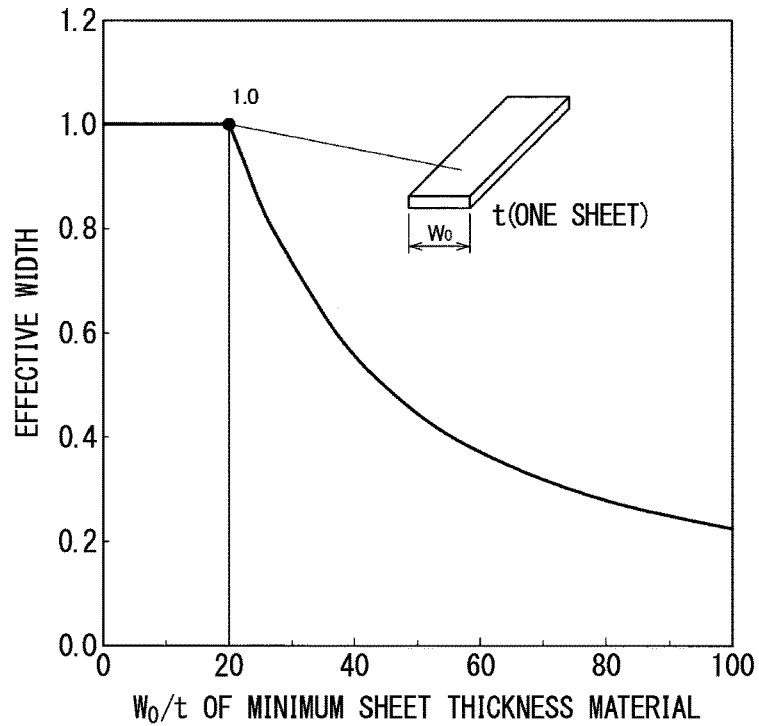
FIG. 5 is a characteristic diagram showing the relationship between the ratio ($W_0/t$) of a sheet width $W_0$ to a sheet thickness t and an effective width of a sheet material.

As the sheet width $W_0$ of the sheet material increases, the cross section along the direction of the sheet width $W_0$ widens, and it is more likely to be affected by the warpage (deflection) of the sheet material, so that the effective width decreases. In addition, as the sheet thickness t decreases, the warpage of the sheet material increases, and the ratio of the width that receives the load to the total sheet width $W_0$ decreases. Therefore, as the sheet width $W_0$ increases and the sheet thickness t decreases, the effective width decreases. That is, the effective width decreases as the ratio ($W_0/t$) of the sheet width $W_0$ to the sheet thickness t increases. FIG. 5 is a characteristic diagram showing the relationship between the ratio ($W_0/t$) of the sheet width $W_0$ to the sheet thickness t of a sheet material having a tensile strength of 1470 MPa and the effective width of the sheet material when restraint is performed to suppress deformation of both ends of the sheet material in an out-of-plane direction, in which $W_0/t$ is shown on the horizontal axis and the effective width is shown on the vertical axis.

As shown in FIG. 5, the effective width decreases as $W_0/t$ increases. Therefore, in order to increase the initial reaction force by increasing the effective width, it is desirable to decrease the sheet width and increase the sheet thickness. As shown in FIG. 5, in a region where $W_0/t$ is less than 20, the effective width is 1.0, and the load can be received by the entire sheet width $W_0$, so that the initial reaction force can be increased.

In other words, in the region where $W_0/t$ is less than 20, the load can be received by the entire sheet width $W_0$. For this reason, even if two sheet materials are not joined by line welding, each sheet material can receive the load with the entire sheet width $W_0$, so that an equivalent initial reaction force to that of a single sheet material having the same total sheet thickness can be obtained.

The present inventor focused on this point, and came up with the idea that regarding sheet materials having a $W_0/t$ at which the effective width is smaller than 1.0 in FIG. 5, that is, sheet materials having a $W_0/t$ of 20 or more, by joining a plurality of sheet materials by welding, for example, it is possible to secure a tensile strength equivalent to that of a sheet material having the same total sheet thickness.

That is, the blank 100 according to the present embodiment includes first sheet material 110 and the second sheet material 120, and these sheet materials are joined by at least three joint lines. Here, of the three joint lines 200a, 200b, and 200c, in a case where the distance between the two outer joint lines (the distance between the first joint line portion 200a and the second joint line portion 200b) is defined as W, following the relationship between the sheet width $W_0$ and the sheet thickness t described above, the two outer joint lines (the first joint line portion 200a and the second joint line portion 200b) are provided to achieve a W/t value of 20 or more, and at least one joint line is provided therebetween. Accordingly, the blank 100 having a plurality of regions where the effective width is increased can be obtained. Accordingly, the resistance to buckling is improved. Since the deformation of the ridge in the out-of-plane direction is also suppressed like the joint line, the same effect can be obtained even if the joint line is replaced with the ridge.

In a case where W/t is less than 20, the original effective width is 1.0, and an action of receiving the load on the entire cross section along the direction of the sheet width $W_0$ is performed. Therefore, even if two sheet materials are not joined, an initial reaction force equivalent to that of a single sheet material having the same total sheet thickness can be obtained. Therefore, in a case where the W/t value is 20 or less, the case can be excluded from a method of joining a plurality of sheet materials according to the present embodiment.

On the other hand, when the W/t value is too large, the interval between the joint lines is too large, and there is concern that the effect of providing the joint lines may not be obtained. Referring to FIG. 5, it can be estimated that a large effect cannot be obtained when the interval between the joint lines is larger than 60 times the sheet thickness. From this, the W/t value is set to 120 or less. Then, when the third joint line portion is added between the first joint line portion and the second joint line portion, the interval between the third joint line portion and the first or second joint line portion becomes smaller than 60 times the sheet thickness, and an effect of providing the third joint line portion can be obtained. As a result of the examination by the present inventors, it is preferable that the upper limit of W/t is set to 120. Therefore, it is preferable that the W/t value satisfies Expression (1).

$$20 \le W/t \le 120 \qquad (1)$$

In addition, of any three joint lines, the length of the length component of the joint line portion 200 provided between the two outer joint line portions in the extension direction of the intermediate line between the two outer joint lines is 250 mm or more. In a case where the length of the length component of the joint line portion 200 in the extension direction of the intermediate line is less than 250 mm, if bending deformation occurs in a portion of the member after forming where the sheet materials are overlapped with each other, an effect of integrating the sheet materials that are overlapped with each other is insufficient, and there is a possibility that bending may occur from unexpected places. The upper limit of the length of the length component of the joint line portion 200 in the extension direction of the intermediate line is not particularly limited, and can be set according to the shape of the sheet material to be used, the portion to be welded, and the like. The "extension direction of the intermediate line between the two outer joint line portions" is the direction indicated by reference numeral α in FIG. 3C, as described with reference to FIG. 3C.

In addition, of the joint lines 200 provided in the blank 100, when the distance between any two adjacent joint lines is defined as W', W'/t may be 40 or less. As shown in FIG. 5, in a case where $W_0/t$ is 40 or less, the effective width is about 0.5 or more. Therefore, dividing a region by a weld line improves the effective width. As a result, the warpage of the sheet material is suppressed, and the initial reaction force can be sufficiently increased. Therefore, when W'/t is 40 or less after dividing a region, the warpage of the region surrounded by the two adjacent joint lines is suppressed, and the effect of integration can be further obtained. It is preferable that W'/t is less than 20. Accordingly, the effective width in a case where the region surrounded by the two adjacent joint lines is regarded as one sheet material is 1.0, so that the warpage of the region surrounded by the joint lines can be further suppressed. Accordingly, the effect of integration can be further obtained.

The configuration of the blank (member) 100 according to the present embodiment has been described above. For example, in a case where the B pillar 400 as illustrated in FIG. 1 is formed of the blank 100 of the present embodiment, in the region R2 in which it is necessary to suppress deflection at the time of a collision, the second sheet material 120 having a large sheet thickness may be joined to the first sheet material 110 which is the substrate, whereby high stiffness is secured. Here, by applying the portion of the blank 100 according to the present embodiment where the second sheet material 120 is provided to the region R2, the region R2 can exhibit characteristics (for example, bending) equivalent to those in a case of being formed of a blank with a single sheet. Accordingly, free sheet thickness design of the B pillar 400 is possible, so that it is possible to secure resistance to buckling (that is, an improvement in collision safety), and achieve a reduction in weight.

3. Vehicle Frame Formed of Member

Figure 6:
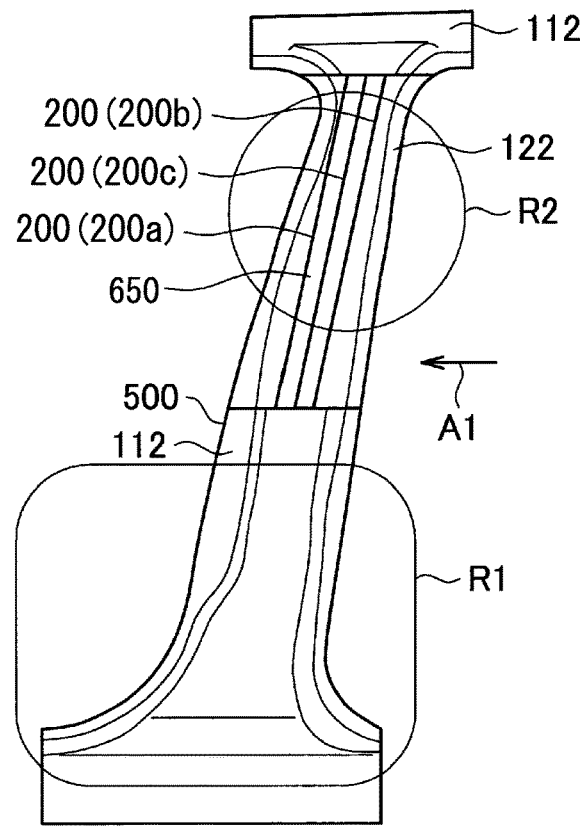
FIG. 6 is a schematic view illustrating an example configured from the blank of FIG. 2.

Next, a vehicle frame for a vehicle, which is a hat-shaped member according to an embodiment, will be described. FIG. 6 is a schematic view illustrating an example of a vehicle frame manufactured by press-forming the blank (member) 100 into the B pillar 400 illustrated in FIG. 1. Similar to FIG. 1, FIG. 6 illustrates a state in which the B pillar 400 is viewed from the side (outside) of the vehicle. Similar to FIG. 1, the region R1 and the region R2 are also illustrated in FIG. 6. In the example illustrated in FIG. 6, the B pillar 400 is formed of the blank 100 according to the present embodiment, and a second member 122 is joined to a first member 112 which is the substrate, in the region R2. The first member 112 corresponds to after processing of the first sheet material 110 included in the blank 100, and the second member 122 corresponds to after processing of the second sheet material 120 included in the blank 100. In this case, as illustrated in FIG. 6, the entire surface of the second member 122 facing the first member 112 may face the first member 112.

Figure 7A:
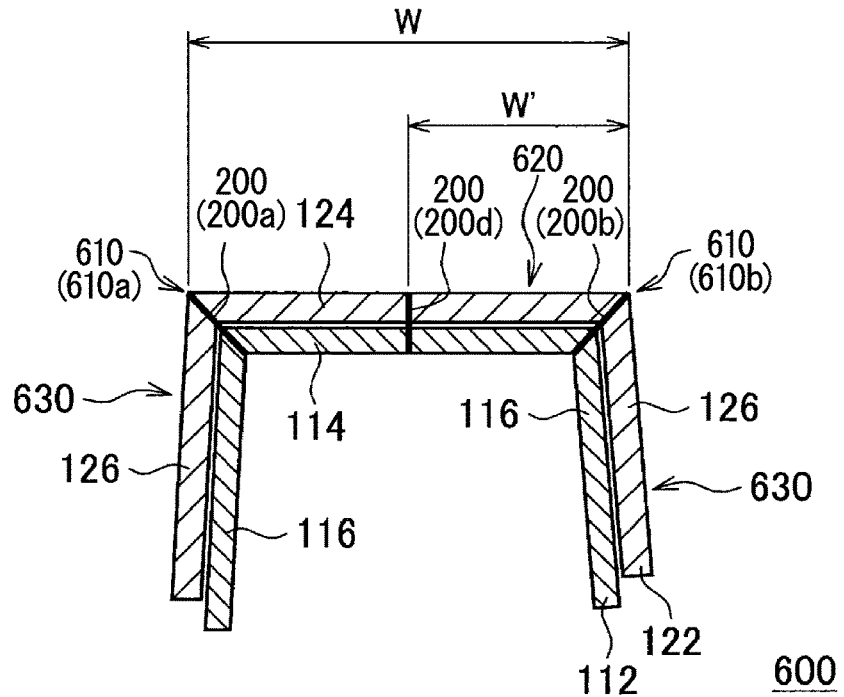
FIG. 7A is a schematic view illustrating a vehicle frame manufactured by forming the blank of the embodiment.
Figure 7B:
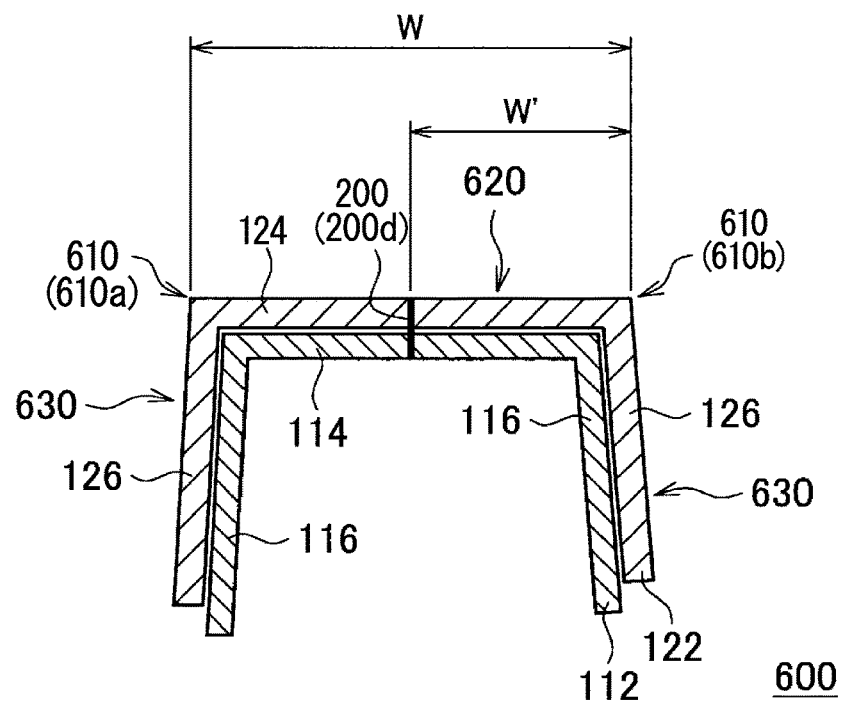
FIG. 7B is a schematic view illustrating a vehicle frame manufactured by forming the blank of the embodiment.
Figure 7C:
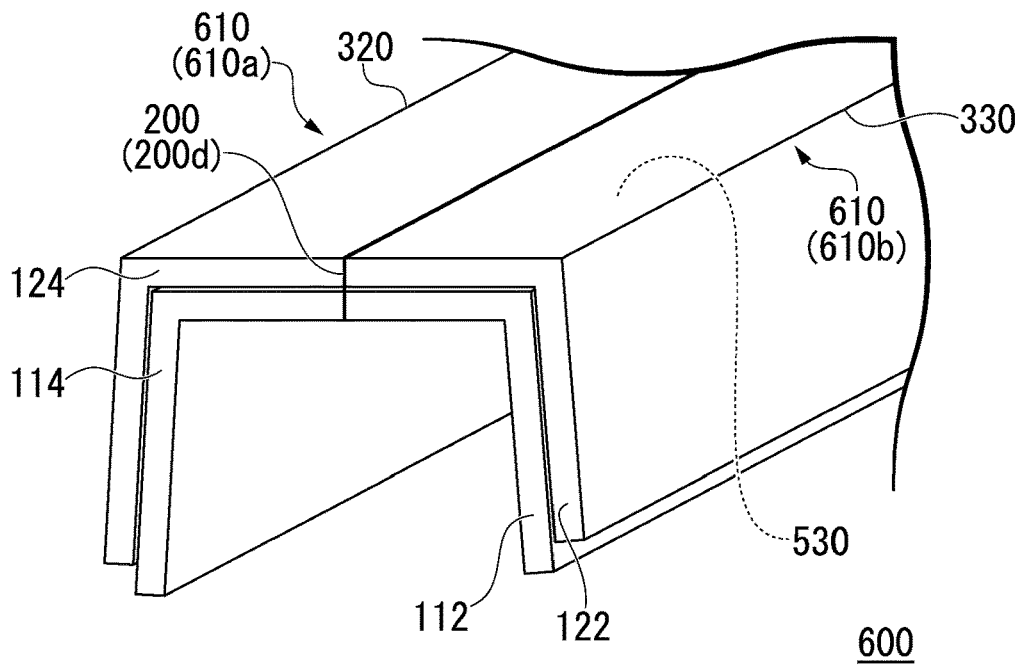
FIG. 7C is a perspective view of the vehicle frame illustrated in FIG. 7B.
Figure 7D:
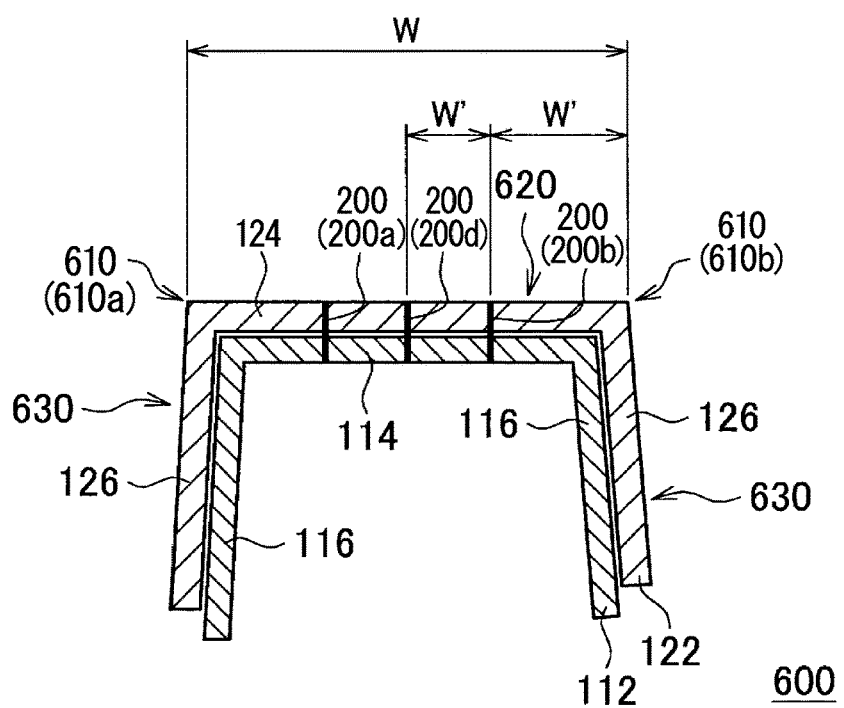
FIG. 7D is a schematic view illustrating a vehicle frame manufactured by forming the blank of the embodiment.
Figure 7E:
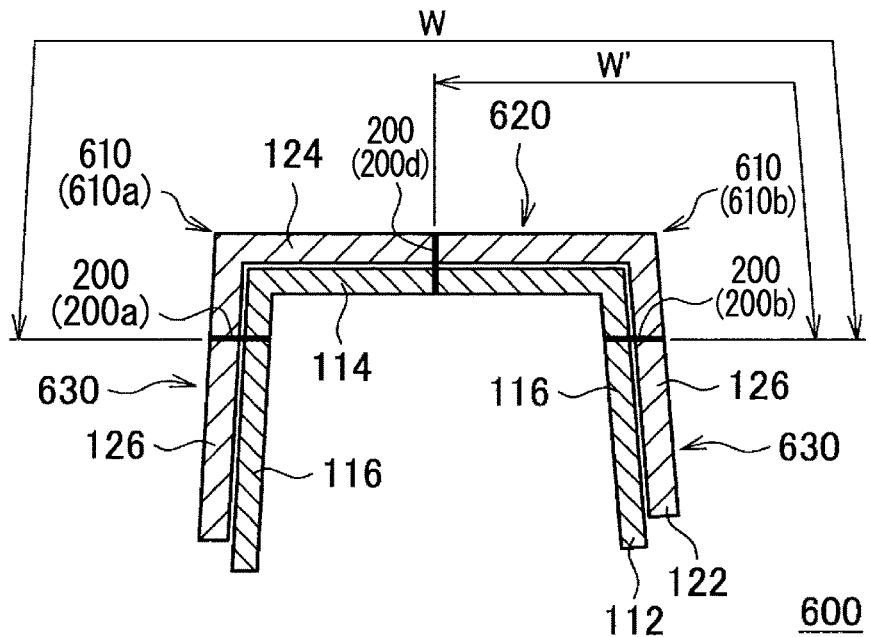
FIG. 7E is a schematic view illustrating a vehicle frame manufactured by forming the blank of the embodiment.
Figure 7F:
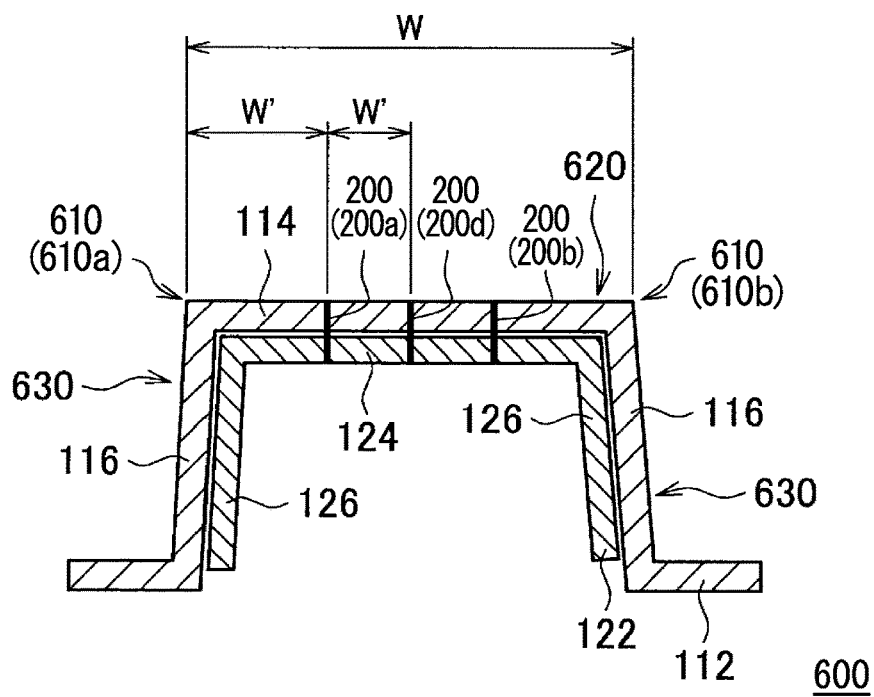
FIG. 7F is a schematic view illustrating a vehicle frame manufactured by forming the blank of the embodiment.
Figure 7G:
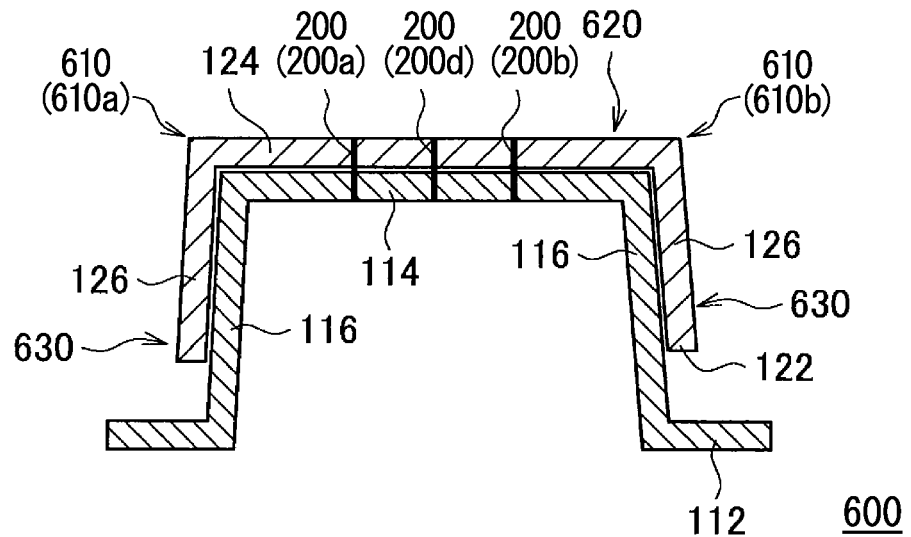
FIG. 7G is a schematic view illustrating a vehicle frame manufactured by forming the blank of the embodiment.
Figure 7H:
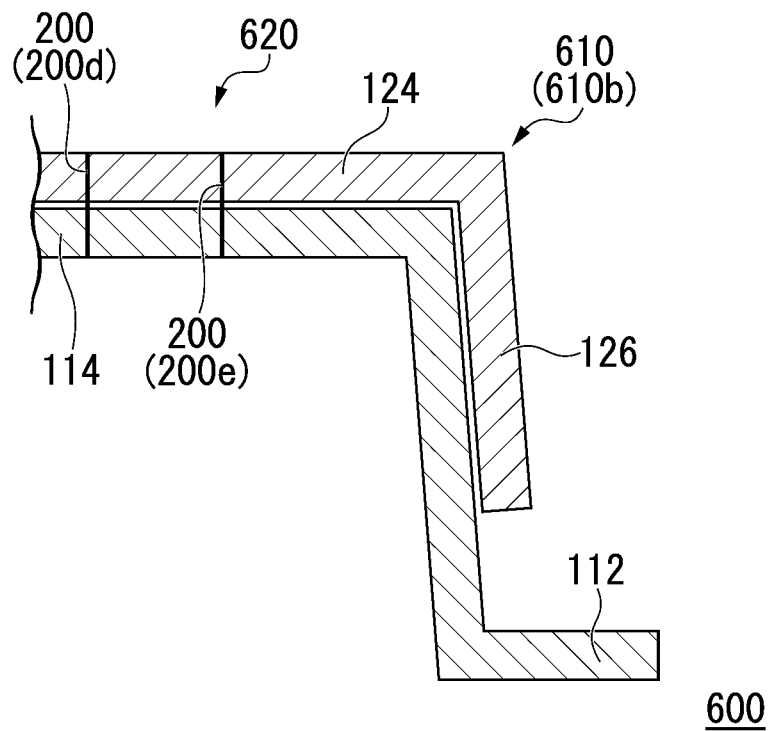
FIG. 7H is a partial schematic view illustrating a vehicle frame manufactured by forming the blank of the embodiment.

FIGS. 7A to 7H are schematic views illustrating vehicle frames formed of the blank (member) 100 of the embodiment. The members illustrated in FIGS. 7A to 7E may be replaced with hat-shaped members as illustrated in FIGS. 7F to 7H. A vehicle frame 600 is a member extending in a predetermined direction, and FIGS. 7A to 7B and 7D to 7H illustrate cross-sectional shapes in a direction orthogonal to the extension direction. As illustrated in FIGS. 7A to 7H, the vehicle frame 600 includes a ridge portion 610, a top wall portion 620, and a standing wall portion 630 formed by bending the blank 100.

The vehicle frame 600 is constituted by the first member 112 and the second member 122, and the first member 112 and the second member 122 are overlapped with each other. The first member 112 has a top wall portion 114 extending in the longitudinal direction of the hat-shaped member. The second member 122 has a top wall portion 124 extending in the longitudinal direction of the hat-shaped member. The sheet thickness of the first member 112 is equal to or less than the sheet thickness of the sheet material of the second member 122.

In the vehicle frame 600 illustrated in FIG. 7A, in the top wall portion 620 (the top wall portion 114 of the first member 112 and the top wall portion 124 of the second member), the first member 112 and the second member 122 are welded to each other at the three joint line portions 200 (the first joint line portion 200a, the second joint line portion 200b, and a fourth joint line portion 200d). In this specification, there are cases where the "joint line portion" may be simply referred to as a "joint line". The joint lines 200a, 200b, and 200d are formed along a direction in which the vehicle frame 600 extends. The first joint line portion 200a and the second joint line portion 200b are provided at the two ridge portions 610 (a first ridge portion 610a and a second ridge portion 610b) of the first member 112 and the second member 122. Of the two ridge portions 610a and 610b, the first ridge portion 610a is a ridge portion 610a of one ends of the top wall portion 114 of the first member 112 and the top wall portion 124 of the second member 122, at which the first member 112 and the second member 122 are overlapped with each other. The second ridge portion 610b is a ridge portion 610b of the other ends of the top wall portion 114 of the first member 112 and the top wall portion 124 of the second member 122, at which the first member 112 and the second member 122 are overlapped with each other.

The three joint line portions 200 (the first joint line portion 200a, the second joint line portion 200b, and the fourth joint line portion 200d) join the first member 112 and the second member 122 at the interface between the first member 112 and the second member 122.

As illustrated in FIG. 7C, the first ridge portion 610a includes a C portion 320 whose shortest in-plane distance from the second ridge portion 610b is 20 times or more and 120 times or less the sheet thickness of the first member 112. The second ridge portion 610b includes a D portion 330 whose shortest in-plane distance from the first ridge portion 610a is 20 times or more and 120 times or less the sheet thickness of the first member 112. The fourth joint line portion 200d is in a fifth region 530 interposed between the C portion 320 and the D portion 330. The "shortest in-plane distance" is the shortest distance on a path along the members of the first member 112 and the second member 122. In FIG. 7C, the "shortest in-plane distance" is a line length along the outer surface in a cross section crossing the longitudinal direction of the member.

The continuous length of the length component of the fourth joint line portion 200d in the fifth region 530 in an extension direction of the intermediate line between the first ridge portion 610a and the second ridge portion 610b is 250 mm or more. The "extension direction of the intermediate line between the first ridge portion 610a and the second ridge portion 610b" means the direction indicated by reference numeral α when the first joint line portion 200a and the second joint line portion 200b in FIG. 3C are replaced with the ridge portions 610.

In the vehicle frame 600 described above, the top wall portion 114 of the first member 112 and the top wall portion 124 of the second member 122 are disposed so as to be on the outside of the vehicle.

With such a vehicle frame 600, the top wall portion 114 of the first member 112 and the top wall portion 124 of the second member 122 are more firmly adhered to each other, and the resistance to buckling of a portion where the top wall portion 114 and the top wall portion 124 are joined to each other can be efficiently increased.

It is preferable that the fourth joint line portion 200d is in a sixth region (not illustrated). The sixth region is a region which is included in the fifth region and is within 20% of the distance between the first ridge portion 610a and the second ridge portion 610b from the intermediate point between the first ridge portion 610a and the second ridge portion 610b on a straight line orthogonal to the intermediate line.

It is preferable that the continuous length of the length component of the fourth joint line portion 200d in the sixth region in the extension direction of the intermediate line between the first ridge portion 610a and the second ridge portion 610b is 250 mm or more.

It is preferable that the fourth joint line portion 200d is in a seventh region (not illustrated) which is in the fifth region and is in a range of 40 times or less the sheet thickness of the first sheet material 110 from the first ridge portion 610a.

It is preferable that the continuous length of the length component of the fourth joint line portion 200d in the fifth region in the extension direction of the intermediate line between the first ridge portion 610a and the second ridge portion 610b is 250 mm or more.

In the vehicle frame 600 illustrated in FIG. 7A, the first member 112 and the second member 122 are welded to each other at the three joint line portions 200a, 200b, and 200d in the top wall portion 620, whereas in the vehicle frame 600 illustrated in FIGS. 7B and 7C, the first member 112 and the second member 122 are welded to each other at the one fourth joint line portion 200d in the top wall portion 620. In the vehicle frame 600 of FIG. 7A, the first joint line portion 200a located at the first ridge portion 610a and the second joint line portion 200b located at the second ridge portion 610b of the vehicle frame 600 can be omitted. Since the first member 112 and the second member 122 are engaged with each other at the first ridge portion 610a and the second ridge portion 610b, the ridge portions 610a and 610b exhibit the same effect as the first joint line portion 200a and the second joint line portion 200b. That is, it is possible to replace the joint line portion with the ridge portion. Therefore, as illustrated in FIGS. 7B and 7C, for example, the ridge portions 610a and 610b are not provided with the joint line portions, and the first member 112 and the second member 122 may be joined to each other by only one fourth joint line portion 200d. By not providing the joint line portions 200a and 200b at the ridge portions 610a and 610b, it is possible to reduce the possibility that cracking may occur at the ridge portions 610a and 610b when the vehicle frame 600 is deformed. Further, the number of joint line portions to be installed can be reduced, and a reduction in cost or strengthening of the joining of the top wall portions 114 and 124 can be achieved.

As illustrated in FIG. 7D, the ridge portions 610a and 610b are not provided with the joint line portions, and in the top wall portion 620 (the top wall portion 114 of the first member 112 and the top wall portion 124 of the second member), the first member 112 and the second member 122 may be joined to each other at only the three joint line portions 200 (the first joint line portion 200a, the second joint line portion 200b, and the fourth joint line portion 200d). In the vehicle frame 600 illustrated in FIG. 7D, the first joint line portion 200a and the second joint line portion 200b also correspond to the ridge portion 610 extending in the longitudinal direction. Furthermore, as illustrated in FIG. 7D, the top wall portion 620 is provided with three or more joint line portions 200 (the first joint line portion 200a, the second joint line portion 200b, and the fourth joint line portion 200d). Therefore, the strain at the joint line portion 200 in the top wall portion 620 can be dispersed, and a higher load can be withstood.

As illustrated in FIG. 7E, the top wall portion 620 of the vehicle frame 600 (the top wall portion 114 of the first member 112 and the top wall portion 124 of the second member) may be provided with the fourth joint line portion 200d on, and the standing wall portion 630 connected to the top wall portion 620 via the ridge portion 610 may also be provided with the joint line portions 200 (the first joint line portion 200a and the second joint line portion 200b). Even in this case, the ridge portion 610 exhibits the same effect as the joint line portions 200 (the first joint line portion 200a and the second joint line portion 200b), so that the ridge portion 610 can be regarded as the joint line portions 200 (the first joint line portion 200a and the second joint line portion 200b).

FIG. 7F illustrates an example in which the first member 112, which is a hat-shaped member having a flange portion, is disposed on the outside, and the U-shaped second member 122 is disposed on the inside as a reinforcing member. In the example of FIG. 7F, similarly to FIG. 7D, the first member 112 and the second member 122 are welded to each other at the three joint line portions 200 (the first joint line portion 200a, the second joint line portion 200b, and the fourth joint line portion 200d).

FIG. 7G illustrates an example in which the first member 112, which is a hat-shaped member having a flange portion, is disposed on the inside, and the U-shaped second member 122 is disposed on the outside as a reinforcing member. In the example of FIG. 7G, similarly to FIG. 7D, the first member 112 and the second member 122 are also welded to each other at the three joint line portions 200 (the first joint line portion 200a, the second joint line portion 200b, and the fourth joint line portion 200d).

In the vehicle frame 600 illustrated in FIG. 7H, in the top wall portion 620, the first member 112 and the second member are welded to each other at two joint line portions 200 (the fourth joint line portion 200d and a fifth joint line portion 200e). The two joint line portions 200 (the fourth joint line portion 200d and the fifth joint line portion 200e) join the first member 112 and the second member 122 at the interface between the first member 112 and the second member 122.

In FIG. 7H, the fourth joint line portion 200d includes an E portion (not illustrated) whose shortest in-plane distance from the second ridge portion 610b is 20 times or more and 120 times or less the sheet thickness of the first member 112. The second ridge portion 610b includes an F portion (not illustrated) whose shortest in-plane distance from the fourth joint line portion 200d is 20 times or more and 120 times or less the sheet thickness of the first member 112. The fifth joint line portion 200e is in an eighth region (not illustrated) interposed between the E portion and the F portion. In the example illustrated in FIG. 7H, the "shortest in-plane distance" is the distance between the fourth joint line portion 200d and the second ridge portion 610b when the top wall portion 620 is viewed in a plan view.

The continuous length of the length component of the fifth joint line portion 200e in the eighth region in an extension direction of the intermediate line between the second ridge portion 610b and the fourth joint line portion 200d is 250 mm or more. The "extension direction of the intermediate line between the second ridge portion 610b and the fourth joint line portion 200d" is the direction indicated by reference numeral α when the joint line portion 200b in FIG. 3C is replaced with the ridge portion 610b.

In the vehicle frame 600 described above, the top wall portion 114 of the first member 112 and the top wall portion 124 of the second member 122 are disposed so as to be on the outside of the vehicle.

With such a vehicle frame 600, the top wall portion 114 of the first member 112 and the top wall portion 124 of the second member 122 are more firmly adhered to each other, and the resistance to buckling of a portion where the top wall portion 114 and the top wall portion 124 are joined to each other can be efficiently increased.

It is preferable that the fifth joint line portion 200e is in a ninth region (not illustrated). The ninth region is a region which is included in the eighth region and is within 20% of the distance between the second ridge portion 610b and the fourth joint line portion 200d from the intermediate point between the second ridge portion 610b and the fourth joint line portion 200d on a straight line orthogonal to the intermediate line.

It is preferable that the continuous length of the length component of the fifth joint line portion 200e in the ninth region in the extension direction of the intermediate line between the second ridge portion 610b and the fourth joint line portion 200d is 250 mm or more.

It is preferable that the fifth joint line portion 200e is in a tenth region (not illustrated) which is in the eighth region and is in a range of 40 times or less the sheet thickness of the first sheet material 110 from the second ridge portion 610b.

The relationship between the sheet thickness and the sheet width of the sheet material in the embodiment described above will be described in detail below.

In the region R2 of the B pillar 400 illustrated in FIG. 6, a top wall portion 650 of the B pillar is provided with at least three joint line portions 200 (200a, 200b, and 200c) along the longitudinal direction of the B pillar 400. W/t represented by the distance W between the two outer joint line portions (200a and 200b) of the three joint line portions and the smaller sheet thickness t of the first member 112 and the second member 122, and the length of the joint line portion 200c satisfy the requirements of the above-described embodiment. That is, at least three joint line portion in which $20 \leq W/t \leq 120$ is satisfied and the length of the length component of the joint line portion 200c in the extension direction of the intermediate line between the joint line portion 200a and the joint line portion 200b is 250 mm or more are provided in the top wall portion 650 of the B pillar 400.

Such a B pillar 400 can be manufactured, for example, by press-forming the blank 100 according to the above-described embodiment. Specifically, the B pillar 400 can be obtained by trimming the blank 100 according to the embodiment into a shape to be formed into the B pillar 400 and performing general press forming on the trimmed blank 100. For example, the B pillar 400 may be provided by separately press-forming the first sheet material 110 and the second sheet material 120 to form the first member 112 and the second member 122, overlapping the first member 112 and the second member 122, and then joining both the members by a laser or the like so that joint lines satisfying the above-mentioned requirements are provided. However, by using the blank 100 according to the above embodiment, the B pillar 400 can be obtained only by press-forming the blank 100 once.

Hereinafter, the vehicle frame 600 formed of the blank 100 of the present embodiment will be described. Here, also in the B pillar 400 illustrated in FIG. 6 or the vehicle frame 600 described below, as in the case of the blank described above, resistance to buckling (that is, an improvement in collision safety) can be improved by defining the W/t value.

That is, the B pillar 400 according to the present embodiment has the first member 112 and the second member 122, and these members are joined to each other by at least three joint lines. Here, in a case where the distance between the two outer joint lines of the three joint lines is defined as W, the outer joint lines are provided so that the W/t value is 20 or more, and at least one joint line is provided therebetween, whereby the B pillar 400 or the vehicle frame 600 having a plurality of regions where the effective width is increased can be obtained. Accordingly, the resistance to buckling is improved.

On the other hand, when the W/t value is too large, the interval between the joint lines is too large, and there is concern that the effect of providing the joint lines may not be obtained. Referring to FIG. 5, it can be estimated that a large effect cannot be obtained when the interval between the joint lines is larger than 60 times the sheet thickness. From this, the W/t value is set to 120 or less. Then, when the joint line is added between the outer joint lines, the interval between the outer joint lines and the joint line added between the outer joint lines becomes smaller than 60 times the sheet thickness, and an effect of providing the joint line added between the outer joint lines can be obtained. Therefore, as a result of the examination by the present inventors, like the blank 100, it is preferable that the upper limit of W/t is set to 120 also in the B pillar 400 or the vehicle frame 600.

In addition, of any three joint lines, the length of the length component of the joint line portion 200 provided between the two outer joint line portions 200 in the extension direction of the intermediate line between the two outer joint lines is 250 mm or more. In a case where the length of the length component of the joint line portion 200 in the extension direction of the intermediate line is less than 250 mm, if bending deformation occurs in a portion of the member after forming where the sheet materials are overlapped with each other, an effect of integrating the sheet materials that are overlapped with each other is insufficient, and there is a possibility that bending may occur from unexpected places. The upper limit of the length of the length component of the joint line portion 200 in the extension direction of the intermediate line is not particularly limited, and can be set according to the shape of the sheet material to be used, the portion to be welded, and the like.

Furthermore, the B pillar 400 or the vehicle frame 600 may be constituted by a plurality of members selected from a plurality of sheet thickness, or may be constituted by a plurality of members having substantially the same sheet thickness.

The first member 112 and the second member 122 may be members having different tensile strengths. For example, the first member 112 is a main frame member of the B pillar 400 or the vehicle frame 600, and the second member 122 functions as a reinforcing member. Therefore, the tensile strength of the second member 122 may be higher than the tensile strength of the first member 112. The tensile strength of the first member 112 is suitably set to 1000 MPa or more. The tensile strength of the second member 122 is suitably set to 1500 MPa or more.

The first member 112 and the second member 122 may have different amounts of carbon (amounts of C) contained in the sheet materials. The amount of carbon may be measured at a ¼ depth position of the sheet thickness of each member from the surface of each member. For example, the B pillar 400 or the vehicle frame 600 is obtained by subjecting the blank 100 described above to hot stamping.

The surfaces of the first member 112 and the second member 122 may be plated with aluminum or the like. However, the surface serving as the joint surface where the first member 112 and the second member 122 are in close contact with each other does not have to be plated.

In addition, as described in the embodiment relating to the blank, of the joint lines 200, when the distance between any two adjacent joint lines is defined as W', W'/t may be 40 or less.

Figure 8:
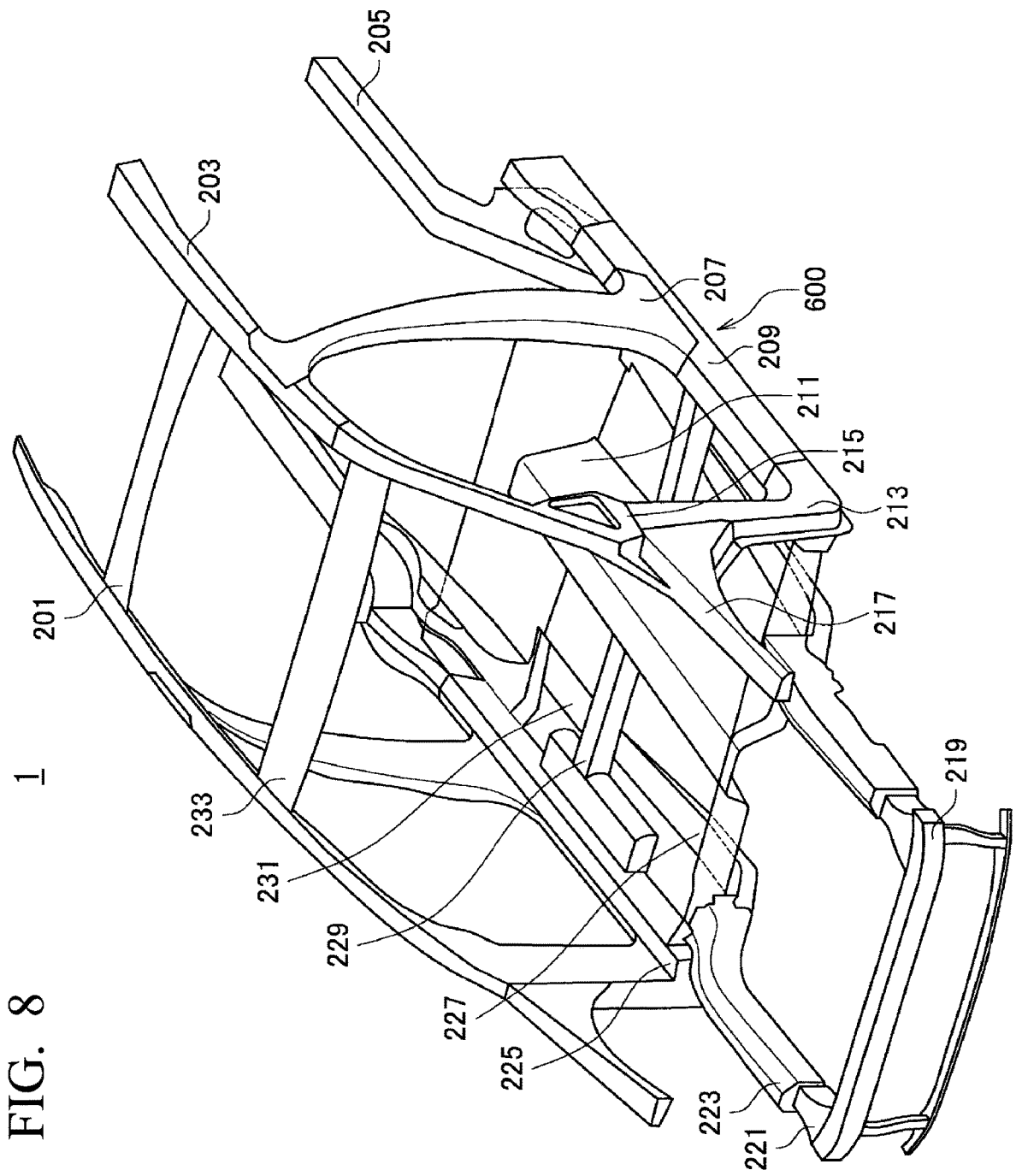
FIG. 8 is a diagram illustrating a vehicle frame as an example to which the member according to the embodiment is applied.

4. Application Example of Sheet Material for Frame according to Present Embodiment FIG. 8 is a diagram showing an automobile frame 1 as an example to which the blank 100 and the vehicle frame 600 according to the present embodiment are applied. The vehicle frame 600 formed of the blank 100 may form the automobile frame 1 as a cabin frame or a shock absorbing frame. Application examples of the vehicle frame 600 as the cabin frame include a roof center reinforcement 201, a roof side rail 203, a B pillar 207, a side sill 209, a tunnel 211, an A pillar lower 213, an A pillar upper 215, a kick reinforcement 227, and a floor cross member 229, an under reinforcement 231, and a front header 233.

Application examples of the vehicle frame 600 as the shock absorbing frame include a rear side member 205, an apron upper member 217, a bumper reinforcement 219, a crash box 221, and a front side member 223.

When the vehicle frame 600 formed of the blank 100 is used as the cabin frame or the shock absorbing frame, since the sheet thickness for each region of the blank 100 is optimally adjusted, the vehicle frame 600 has a sufficient load capacity. Furthermore, since the sheet thickness for each region of the blank 100 is optimally adjusted, the impact absorption capacity and proof stress of the vehicle frame 600 are enhanced, so that even in a case where a side collision or like is input to the automobile frame 1, the amount of intrusion of the vehicle frame 600 into the vehicle can be suppressed while absorbing the impact by sufficient deformation. In addition, it is also possible to use the blank 100 as it is for an automobile frame such as in a case of use for a floor panel of an automobile. Even in this case, free design such as increasing the sheet thickness of only a portion that needs stiffness in the floor panel can be realized.

While the example in which the blank 100 and the vehicle frame 600 are applied to the automobile frame 1 has been described, the present disclosure is not limited thereto. The blank 100 and the vehicle frame 600 can be applied to a frame included in vehicles other than automobiles. Alternatively, the blank 100 and the vehicle frame 600 can also be applied to a structure included in a building or the like.

EXAMPLES

Figure 4:
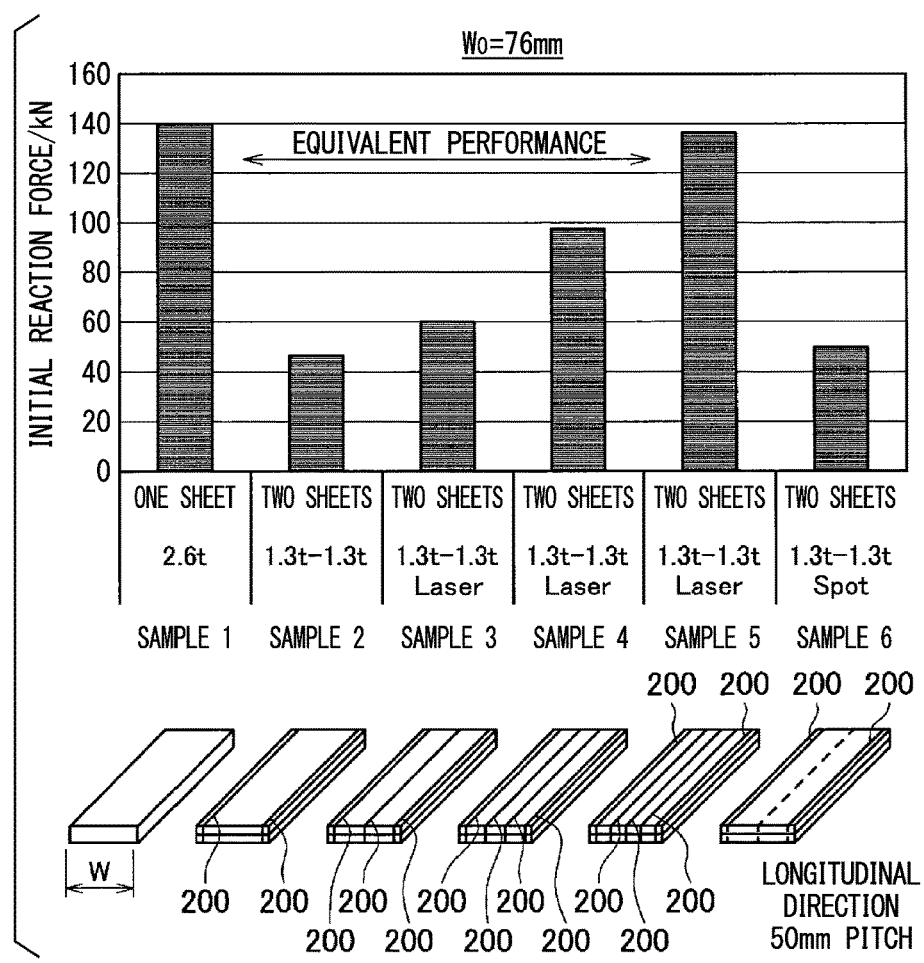
FIG. 4 is a diagram showing an effect of the number of joint lines on an initial reaction force.

The present inventors intensively examined the effect of a welding form in the blank 100 and the number of joint lines 200 on the initial reaction force with respect to the load. FIG. 4 is a diagram showing the effect of the welding form and the number of joint lines 200 on the initial reaction force. In FIG. 4, the initial reaction force generated in a case where a load is applied to the end surface of the blank 100 in a direction (the direction along the joint line 200, arrow A2 direction illustrated in FIGS. 3A and 3B) orthogonal to the width direction using a sheet material having a sheet width $W_0$ of 76 mm is represented on the vertical axis.

Here, in the example shown in FIG. 4, a sheet material having a tensile strength of about 1500 MPa was used, and Sample 1 formed of one sheet material having a sheet thickness of 2.6 mm and samples (Samples 2 to 6) in which two sheet materials having a sheet thickness of 1.3 mm were overlapped with each other were prepared. That is, in Samples 2 to 6, the total sheet thickness of the two sheets is the same as the sheet thickness of Sample 1. Sample 2 is obtained by overlapping the two sheet materials and performing line welding on only both ends of the sheet materials. Samples 3 to 6 had the two sheet materials joined by welding, but were different in the welding method (the number of joint lines and the like). In Sample 3, line welding was performed on a total of three joint lines 200 in both end portions and the center portion of the sheet materials, in Sample 4, line welding was performed on a total of four joint lines 200 in both end portions and the center portion of the sheet materials, and in Sample 5, line welding was performed on a total of five joint lines 200 in both end portions and the center portion of the sheet materials. In Sample 6, line welding was performed on both end portions of the sheet materials, and spot welding was performed on the center portion along a total of three imaginary lines with a nugget diameter of $5\sqrt{t}$ (t is the sheet thickness (mm) of a thinner sheet material, that is, 1.3 mm) at a pitch of 50 mm. Laser welding was performed as the line welding. Then, for each of Samples 1 to 6, the initial reaction force in a case where a load was applied in the direction orthogonal to the sheet width $W_0$ was measured. Since the outer joint lines 200 were provided in the vicinity of both end portions of the sheet material, the sheet width $W_0$ is substantially equal to the distance W between the two outer joint lines.

As shown in FIG. 4, in Sample 1, the initial reaction force was about 140 [kN]. In Sample 2, although the total sheet thickness was 2.6 mm, which was the same as in Sample 1, the initial reaction force did not reach 50 [kN], and the initial reaction force was less than half that of Sample 1.

As shown in Samples 3 to 5, the initial reaction force increased as the number of joint lines 200 increased. In Sample 5, an initial reaction force equivalent to that in Sample 1 was obtained. On the other hand, in Sample 6 in which spot welding was performed, although spot welding was performed along three lines, only an initial reaction force lower than that of sample 3 was obtained, and an initial proof stress equivalent to that of Sample 2 was obtained.

From the above results, it was found that in a case where the two sheet materials are welded by line welding, the initial proof stress can be improved by providing at least three joint lines 200. In particular, it could be seen that by providing three or more joint lines 200 in addition to the outer joint lines 200, it is possible to secure a tensile strength equivalent to that of a single sheet material having the same sheet thickness as the total sheet thickness of two sheet materials. It is considered that this is due not only to the effect of expanding an effective region of the sheet materials, but also to a reduction in the possibility of fracture of the joint lines caused by the dispersion of strain to the joint lines.

While the preferred embodiments of the present disclosure have been described above in detail with reference to the accompanying drawings, the present disclosure is not limited to such examples. It is obvious that a person having ordinary knowledge in the technical field to which the present disclosure pertains can come up with various changes or modifications within the scope of the technical idea described in the claims, and it is understood that these also belong to the technical scope of the present disclosure.

INDUSTRIAL APPLICABILITY

According to the present invention, it is possible to provide a member and a vehicle frame capable of satisfying both an improvement in collision safety and a demand for a reduction in weight by realizing different thicknesses in a free manner. Therefore, the present invention has extremely good industrial applicability.

BRIEF DESCRIPTION OF THE REFERENCE SYMBOLS

100 Blank (member)
110 First sheet material

112 First member
114 Top wall portion of first member 112
120 Second sheet material
122 Second member
124 Top wall portion of second member 122
200 joint line
300 A portion
310 B portion
320 C portion
330 D portion
500 First region
510 Second region
520 Third region
530 Fifth region
600 Vehicle frame
610 Ridge portion
620 Top wall portion
α Extension direction of intermediate line

What is claimed is:

1. A member comprising:
a first sheet material;
a second sheet material;
a first joint line portion;
a second joint line portion; and
a third joint line portion,
wherein a sheet thickness of the first sheet material is equal to or less than a sheet thickness of the second sheet material,
the first sheet material and the second sheet material are overlapped with each other,
the first joint line portion, the second joint line portion, and the third joint line portion each join the first sheet material and the second sheet material at an interface between the first sheet material and the second sheet material,
the first joint line portion includes an A portion whose shortest in-plane distance from the second joint line portion is 20 times or more and 120 times or less the sheet thickness of the first sheet material,
the second joint line portion includes a B portion whose shortest in-plane distance from the first joint line portion is 20 times or more and 120 times or less the sheet thickness of the first sheet material,
the third joint line portion is in a first region interposed between the A portion and the B portion, and
a length of a length component of the third joint line portion in the first region in an extension direction of an intermediate line between the first joint line portion and the second joint line portion is 250 mm or more.

2. The member according to claim 1,
wherein the third joint line portion is in a second region which is in the first region and is within 20% of a distance between the first joint line portion and the second joint line portion from an intermediate point between the first joint line portion and the second joint line portion on a straight line orthogonal to the intermediate line.

3. The member according to claim 2,
wherein a continuous length of a length component of the third joint line portion in the second region in the extension direction of the intermediate line between the first joint line portion and the second joint line portion is 250 mm or more.

4. The member according to claim 1,
wherein the third joint line portion is in a third region which is in the first region and is in a range of 40 times or less the sheet thickness of the first sheet material from the first joint line portion.

5. The member according to claim 4,
wherein a continuous length of a length component of the third joint line portion in the third region in the extension direction of the intermediate line between the first joint line portion and the second joint line portion is 250 mm or more.

6. A vehicle frame including the member according to claim 1, comprising:
a first ridge portion;
a second ridge portion; and
a top wall portion,
wherein the top wall portion is between the first ridge portion and the second ridge portion,
the first joint line portion, the second joint line portion, and the third joint line portion are in the top wall portion, and
the top wall portion is disposed so as to be on an outside of a vehicle.

7. A member comprising:
a first sheet material;
a second sheet material;
a first joint line portion;
a third joint line portion; and
a first ridge portion,
wherein a sheet thickness of the first sheet material is equal to or less than a sheet thickness of the second sheet material,
the first sheet material and the second sheet material are overlapped with each other at the first ridge portion, the first joint line portion, and the third joint line portion,
the first joint line portion and the third joint line portion each join the first sheet material and the second sheet material at an interface between the first sheet material and the second sheet material,
the first joint line portion includes an A portion whose shortest in-plane distance from the first ridge portion is 20 times or more and 120 times or less the sheet thickness of the first sheet material,
the first ridge portion includes a B portion whose shortest in-plane distance from the first joint line portion is 20 times or more and 120 times or less the sheet thickness of the first sheet material,
the third joint line portion is in a first region interposed between the A portion and the B portion, and
a length of a length component of the third joint line portion in the first region in an extension direction of an intermediate line between the first joint line portion and the first ridge portion is 250 mm or more.

8. The member according to claim 7,
wherein the third joint line portion is in a second region which is in the first region and is within 20% of a distance between the first joint line portion and the first ridge portion from an intermediate point between the first joint line portion and the first ridge portion on a straight line orthogonal to the intermediate line.

9. The member according to claim 8,
wherein a continuous length of a length component of the third joint line portion in the second region in the extension direction of the intermediate line between the first joint line portion and the first ridge portion is 250 mm or more.

10. The member according to claim 7,
wherein the third joint line portion is in a third region which is in the first region and is in a range of 40 times or less the sheet thickness of the first sheet material from the first joint line portion.

11. The member according to claim 10, wherein a continuous length of a length component of the third joint line portion in the third region in the extension direction of the intermediate line between the first joint line portion and the first ridge portion is 250 mm or more.

12. The member according to claim 7, wherein the third joint line portion is in a fourth region which is in the first region and is in a range of 40 times or less the sheet thickness of the first sheet material from the first ridge portion.

13. The member according to claim 12, wherein a continuous length of a length component of the third joint line portion in the fourth region in the extension direction of the intermediate line between the first joint line portion and the first ridge portion is 250 mm or more.

14. The member according to claim 1, wherein all end portions of the first sheet material are inside the second sheet material.

15. The member according to claim 7, wherein all end portions of the first sheet material are inside the second sheet material.

16. The member according to claim 1, wherein all end portions of the second sheet material are inside the first sheet material.

17. The member according to claim 7, wherein all end portions of the second sheet material are inside the first sheet material.

18. The member according to claim 1, wherein the first joint line portion is provided along a longitudinal direction of the first sheet material.

19. The member according to claim 7, wherein the first joint line portion is provided along a longitudinal direction of the first sheet material.

20. The member according to claim 1, wherein the first joint line portion is provided along a longitudinal direction of the second sheet material.

21. The member according to claim 7, wherein the first joint line portion is provided along a longitudinal direction of the second sheet material.

22. A vehicle frame including the member according to claim 7, comprising:
a second ridge portion; and
a top wall portion,
wherein the top wall portion is between the first ridge portion and the second ridge portion,
the first joint line portion and the third joint line portion are in the top wall portion, and
the top wall portion is disposed so as to be on an outside of a vehicle.

23. The vehicle frame according to claim 22, wherein the first sheet material and the second sheet material are overlapped with each other at the second ridge portion.

24. A vehicle frame that is a hat-shaped member, comprising:
a first member;
a second member;
a fourth joint line portion;
a first ridge portion; and
a second ridge portion,
wherein a sheet thickness of the first member is equal to or less than a sheet thickness of the second member,
the first member and the second member are overlapped with each other at the first ridge portion and the second ridge portion,
the first member has a top wall portion extending in a longitudinal direction of the hat-shaped member,
the second member has a top wall portion extending in the longitudinal direction of the hat-shaped member,
the first ridge portion is a ridge portion of one ends of the top wall portion of the first member and the top wall portion of the second member, at which the first member and the second member are overlapped with each other,
the second ridge portion is a ridge portion of the other ends of the top wall portion of the first member and the top wall portion of the second member, at which the first member and the second member are overlapped with each other,
the first ridge portion, the second ridge portion, and the fourth joint line portion join the first member and the second member at an interface between the first member and the second member,
the first ridge portion includes a C portion whose shortest in-plane distance from the second ridge portion is 20 times or more and 120 times or less the sheet thickness of the first member,
the second ridge portion includes a D portion whose shortest in-plane distance from the first ridge portion is 20 times or more and 120 times or less the sheet thickness of the first member,
the fourth joint line portion is in a fifth region interposed between the C portion and the D portion,
a continuous length of a length component of the fourth joint line portion in the fifth region in an extension direction of an intermediate line between the first ridge portion and the second ridge portion is 250 mm or more, and
the top wall portion of the first member and the top wall portion of the second member are disposed so as to be on an outside of a vehicle.

25. The vehicle frame according to claim 24, wherein the fourth joint line portion is in a sixth region which is in the fifth region and is within 20% of a distance between the first ridge portion and the second ridge portion from an intermediate point between the first ridge portion and the second ridge portion on a straight line orthogonal to the intermediate line.

26. The vehicle frame according to claim 25, wherein a continuous length of a length component of the fourth joint line portion in the sixth region in the extension direction of the intermediate line between the first ridge portion and the second ridge portion is 250 mm or more.

27. The vehicle frame according to claim 24, wherein the fourth joint line portion is in a seventh region which is in the fifth region and is in a range of 40 times or less the sheet thickness of the first member from the first ridge portion.

28. The vehicle frame according to claim 27, wherein a continuous length of a length component of the fourth joint line portion in the fifth region in the extension direction of the intermediate line between the first ridge portion and the second ridge portion is 250 mm or more.

* * * * *